United States Patent
Ikeda et al.

(10) Patent No.: US 9,857,051 B2
(45) Date of Patent: Jan. 2, 2018

(54) OPTICAL ELEMENT, ILLUMINATION DEVICE INCLUDING THE OPTICAL ELEMENT, AND ILLUMINATION MODULE INCLUDING THE ILLUMINATION DEVICE

(71) Applicant: NALUX CO., LTD., Osaka-shi, Osaka (JP)

(72) Inventors: Katsumoto Ikeda, Osaka (JP); Daisuke Seki, Osaka (JP)

(73) Assignee: NALUX CO., LTD., Osaka-Shi, Osaka (JP)

( * ) Notice: Subject to any disclaimer, the term of this patent is extended or adjusted under 35 U.S.C. 154(b) by 506 days.

(21) Appl. No.: 14/299,179

(22) Filed: Jun. 9, 2014

(65) Prior Publication Data

US 2014/0328062 A1    Nov. 6, 2014

Related U.S. Application Data

(63) Continuation of application No. PCT/JP2012/082783, filed on Dec. 18, 2012.

(Continued)

(51) Int. Cl.
*F21V 5/04*    (2006.01)
*F21V 5/00*    (2015.01)
(Continued)

(52) U.S. Cl.
CPC ............... *F21V 5/007* (2013.01); *F21V 5/04* (2013.01); *F21V 5/048* (2013.01); *F21V 5/08* (2013.01);
(Continued)

(58) Field of Classification Search
CPC . F21V 5/04; F21V 5/046; F21V 5/048; F21V 5/08; F21V 5/007; G02B 19/0014;
(Continued)

(56) References Cited

U.S. PATENT DOCUMENTS 4,609,978 A * 9/1986 Hsieh ..................... F21V 5/04
362/311.06
2006/0238884 A1* 10/2006 Jang ....................... F21V 5/04
359/653
(Continued)

FOREIGN PATENT DOCUMENTS

EP    2175193 A1    4/2010
EP    2317216 A2    5/2011
(Continued)

OTHER PUBLICATIONS

International Search Report dated Mar. 26, 2013 corresponding to International Patent Application No. PCT/JP2012/082783 and English translation thereof.

*Primary Examiner* — Jong-Suk (James) Lee
*Assistant Examiner* — James Endo
(74) *Attorney, Agent, or Firm* — Squire Patton Boggs (US) LLP

(57) ABSTRACT

An optical element is provided. When in a xz cross section, an angle which a ray travelling from the origin at θr forms with the normal to the light receiving surface is designated as φx, an angle which a ray travelling from b in the z axis direction forms, after the surface, with the z axis direction is designated as θib, in a yz cross section, an angle which a ray travelling from the origin at θr forms with the normal to the light receiving surface is designated as φy, angles which a ray travelling from a in the z axis direction forms, after the light receiving and exiting surfaces, with the z axis direction are designated as θia and θea, and an angle which a ray travelling from the origin at arctan(a/ha) forms, after the light exiting surface, with the z axis direction is designated as $\theta_{eha}$, $\varphi_y > \varphi_x$ $(0 < \theta_r < 60°)$ $\theta_{eha} > 45°$ (Continued)

(a)

(b)

$\theta_{ea}>45°$ $\theta_{ia}>\theta_{ib}$ are satisfied.

8 Claims, 14 Drawing Sheets

Related U.S. Application Data

(60) Provisional application No. 61/577,878, filed on Dec. 20, 2011.

(51) Int. Cl.
    *G02B 19/00* (2006.01)
    *F21V 5/08* (2006.01)
    *F21W 131/103* (2006.01)
    *F21Y 115/10* (2016.01)

(52) U.S. Cl.
    CPC ..... *G02B 19/0014* (2013.01); *G02B 19/0066* (2013.01); *G02B 19/0071* (2013.01); *F21W 2131/103* (2013.01); *F21Y 2115/10* (2016.08)

(58) Field of Classification Search
    CPC ........... G02B 19/0066; G02B 19/0071; F21W 2131/103
    See application file for complete search history.

(56) References Cited

U.S. PATENT DOCUMENTS

| | | | | |
|---|---|---|---|---|
| 2007/0195534 A1* | 8/2007 | Ha | ........................ | B29C 33/005 362/327 |
| 2008/0007966 A1* | 1/2008 | Ohkawa | ................. | G02B 5/045 362/608 |
| 2008/0192479 A1* | 8/2008 | Wanninger | ................ | F21V 5/04 362/308 |
| 2010/0073937 A1* | 3/2010 | Ho | ............................ | F21V 5/04 362/335 |
| 2010/0085763 A1* | 4/2010 | Aguglia | .................... | F21V 5/04 362/311.06 |
| 2010/0135028 A1 | 6/2010 | Kokubo | | |
| 2010/0149801 A1 | 6/2010 | Lo et al. | | |
| 2010/0254145 A1* | 10/2010 | Yamaguchi | ........ | G02B 19/0061 362/311.01 |
| 2010/0302785 A1* | 12/2010 | Zhou | ........................ | F21V 5/04 362/311.02 |
| 2011/0157898 A1* | 6/2011 | Kanai | ....................... | F21V 5/04 362/296.05 |
| 2011/0164426 A1* | 7/2011 | Lee | .................... | G02B 19/0061 362/335 |
| 2011/0249451 A1* | 10/2011 | Fujii | ................. | G02B 27/0955 362/317 |
| 2011/0279751 A1 | 11/2011 | Iiyama et al. | | |

FOREIGN PATENT DOCUMENTS

| | | |
|---|---|---|
| EP | 2378338 A1 | 10/2011 |
| JP | 3875247 B2 | 1/2007 |
| JP | 2009-43628 A | 2/2009 |
| JP | 2009-099604 A | 5/2009 |
| JP | 3153647 U | 8/2009 |
| JP | 2011-071382 A | 4/2011 |
| JP | 2011-95751 A | 5/2011 |
| JP | 2011-221190 A | 11/2011 |
| WO | WO 2011/048735 A1 | 4/2011 |

* cited by examiner (a)

(b)

(c)

(a)

(b)

(c)

(a)

(b)

(a)

(b)

(a)

(b)

(a)

(b)

OPTICAL ELEMENT, ILLUMINATION DEVICE INCLUDING THE OPTICAL ELEMENT, AND ILLUMINATION MODULE INCLUDING THE ILLUMINATION DEVICE

TECHNICAL FIELD

The present invention relates to an optical element configured to diverge lights from the light source, an illumination device including the optical element and an illumination module using the illumination device.

BACKGROUND ART

Recently LED (light emitting diode) light sources have been widely used. Since a large portion of lights of a LED light source is emitted toward the front, an optical element configured to diverge lights from the LED light source is commonly used in a combination with the LED light source. Particularly, when LED light sources are used as light sources of an illumination unit for illuminating a large area, such as that for backlight, optical elements configured to diverge lights from the LED light sources over a large angle are used such that a compact illumination unit can be realized with a small number of LED light sources (for example, Patent Document 1).

Backlight illumination units are divided into two types. One is an edge-light type in which light sources are arranged on a side of a diffusion plate or the like and lights for illumination are sent toward the front by the principal of a light-guiding plate. The other is a direct type in which plural light sources are arranged immediately below a plane to be illuminated. The direct type includes an illumination unit of line arrangement type in which light sources are arranged in a single line or in plural lines.

When LED light sources or the like are used for light sources of such a backlight illumination unit of line arrangement type, the light sources in a line or in lines should preferably be configured to illuminate a large area with uniform light intensity as a whole.

However, when LED light sources or the like are used for light sources of a backlight illumination unit of line arrangement type, optical elements which are specially intended for use with the light sources such as LEDs arranged in a line or in lines for illumination of a large area with uniform light intensity as a whole have not been developed.

PATENT DOCUMENTS

Patent Document 1: JP2006-92983A (JP3875247B)

Accordingly, there is a need for optical elements which are specially intended for use with the light sources such as LEDs arranged in a line or in lines for illumination of a large area with uniform light intensity as a whole.

SUMMARY OF INVENTION

An optical element according to a first aspect of the present invention is an optical element including a light receiving surface which is configured to cover a virtual light source arranged on a plane and a light exiting surface which covers the light receiving surface, the optical element being configured such that lights from the virtual light source passes through the light receiving surface and the light exiting surface and goes to the outside for illumination. When an axis which passes thorough the center of the virtual light source and which is perpendicular to the plane is designated as z axis, two axes which are orthogonal to each other and which pass thorough the center which is designated as the origin are designated as x axis and y axis, the maximum value of x coordinate of the virtual light source is designated as b and the maximum value of y coordinate of the virtual light source is designated as a, the light receiving surface is shaped like a cap, the top of the cap being a point of intersection with z axis. When in a cross section containing x axis and z axis, an angle which a virtual ray which travels from the origin at an angle of θr with respect to z axis forms, at a point of intersection with the light receiving surface, with the normal to the light receiving surface is designated as φx, an angle which a virtual ray which travels from a point b which is located at a distance of b from the origin and on x axis, in the direction of z axis forms, after having passed through the light receiving surface, with the z axis direction is designated as θib, in a cross section containing y axis and z axis, an angle which a virtual ray which travels from the origin at an angle of θr with respect to z axis forms, at a point of intersection with the light receiving surface, with the normal to the light receiving surface is designated as φy, an angle which a virtual ray which travels from a point a which is located at a distance of a from the origin and on y axis, in the direction of z axis forms, after having passed through the light receiving surface, with the z axis direction is designated as θia and then forms, after having passed through the light exiting surface, with the z axis direction is designated as θea, a distance from the point a to a point of intersection between the normal at the point a to the xy plane and the light receiving surface is designated as ha, and an angle which a virtual ray which travels from the origin at an angle of arctan(a/ha) with respect to z axis forms, after having passed through the light exiting surface, with the z axis direction is designated as $\theta_{eha}$, the light receiving surface is configured such that $$\varphi_y > \varphi_x$$

is satisfied in the range 0<θr<60°, and $$\theta_{eha} > 45°$$

$$\theta_{ea} > 45°$$

$$\theta_{ia} > \theta_{ib}$$

are satisfied.

Since the optical element according to the present aspect is configured such that $$\theta_{eha} > 45°$$

$$\theta_{ea} > 45°$$

are satisfied, typical virtual rays emitted at the center and the edges in the y axis direction of the light source are sufficiently diverged in the y axis direction. Further, the light receiving surface is configured such that $$\varphi_y > \varphi_x$$

is satisfied in the range 0<θr<60°, and $$\theta_{ia} > \theta_{ib}$$

is satisfied, virtual rays emitted at the center and the edges of the light source are diverged at the light receiving surface more widely in the y axis direction than in the x axis direction.

In the optical element according to a first embodiment of the first aspect of the present invention, the light receiving surface is further configured such that $$\tan(\theta_{eha}) > 2$$

is satisfied.

Since in the optical element according to the present embodiment, the light receiving surface is further configured such that $$\tan(\theta_{eha}) > 2$$

is satisfied, typical virtual rays from the center of the light source are more widely diverged in the y axis direction.

In the optical element according to a second embodiment of the first aspect of the present invention, when in a cross section containing x axis and z axis, an angle which a virtual ray which travels from the origin at an angle of θr with respect to z axis forms, after having passed through the light exiting surface, with the z axis direction is designated as θex, and in a cross section containing y axis and z axis, an angle which a virtual ray which travels from the origin at an angle of θr with respect to z axis forms, after having passed through the light exiting surface, with the z axis direction is designated as θey, the light receiving surface is configured such that $$\theta_{ex} > \theta_r$$

$$\theta_{ey} > \theta_r$$

are satisfied in the range 0<θr<60°.

Since in the optical element according to the present embodiment the light receiving surface is configured such that $$\theta_{ex} > \theta_r$$

$$\theta_{ey} > \theta_r$$

are satisfied in the range 0<θr<60°, virtual rays emitted at the center of the light source and travel in the xz cross section and in the yz cross section are diverged with reliability.

An illumination device according to a second aspect of the present invention includes a light source arranged on a plane and the optical element according to the first aspect, the optical element covering the light source.

According to the illumination device of the present aspect, functions of the optical element according to the first aspect, which are described using virtual rays, are realized.

In the illumination device according to a first embodiment of the second aspect of the present invention, a shape of the light source in the xy plane has x-axis symmetry and y-axis symmetry.

In an illumination module according to a third aspect of the present invention, illumination devices, each of which is the illumination device according to the second aspect, are arranged in a single line or in plural lines in the x axis direction.

The illumination module according to a first embodiment of the third aspect of the present invention has a rectangular surface having sides in the x axis direction and in the y axis direction and when a distance in the y axis direction from a side in the x axis direction to the center of a light source in the line of illumination devices, the line being the closest to the side in the x axis direction is designated as Ymax and a distance in the z axis direction from the surface on which the illumination devices are arranged to a plane to be illuminated is designated as D, $$\frac{Y_{max}}{D} > \tan(\theta_{eha})$$

is satisfied.

In the illumination module according to the present embodiment, rays will not illuminate the outside of the plane to be illuminated, and therefore deterioration of efficiency of illumination can be prevented.

In the illumination module according to a second embodiment of the third aspect of the present invention, when an interval in the x axis direction between illumination devices is designated as Xp and a distance in the z axis direction from the surface on which the illumination devices are arranged to the plane to be illuminated is designated as D, $$\frac{X_p}{D} > \tan(\theta_{eb})$$

is satisfied.

In the illumination module according to the present embodiment, an upper limit of θeb which is a divergence of rays in the x axis direction at the light receiving surface serves to enhance uniformity of illuminance along the x axis direction.

DESCRIPTION OF EMBODIMENTS

Figure 1:
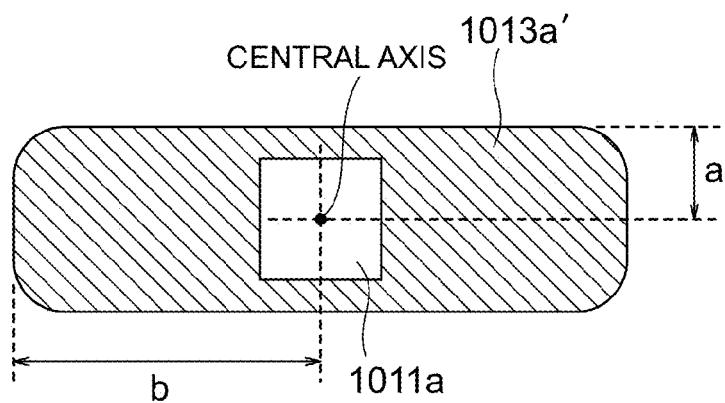
FIGS. 1(a)-1(c) show an example of a LED light source used with an optical element according to the present invention.
Figure 1:
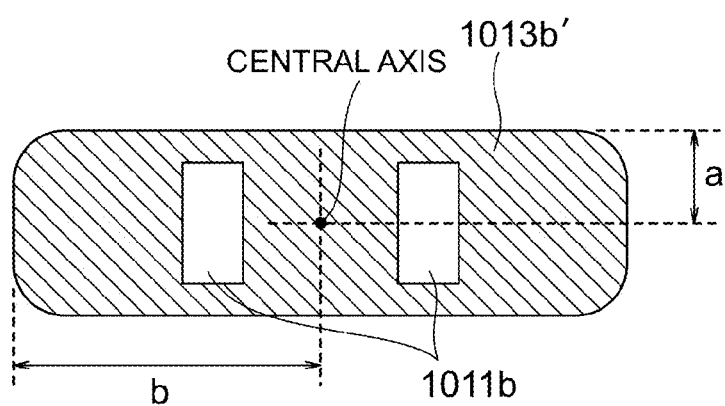
Figure 1:
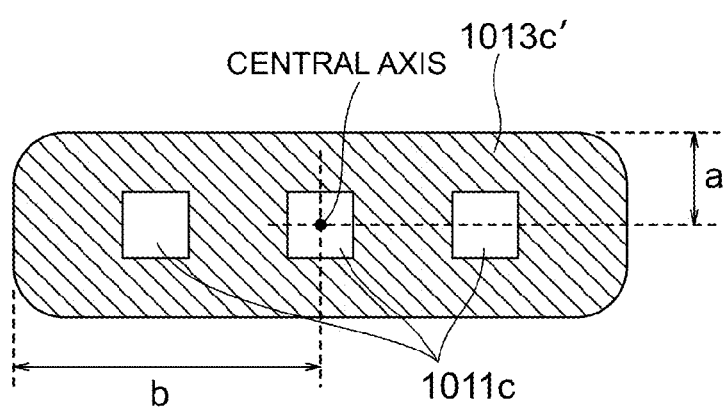

FIGS. 1(a)-1(c) show an example of a LED light source used with an optical element according to the present invention. The LED light source includes a light emitting chip and fluorescent agent provided around the chip.

FIG. 1(a) shows a plan view of a LED light source 101a. The LED light source 101a includes a light emitting chip 1011a and fluorescent agent 1013a' provided around the chip. A distance from the center to an edge in the vertical direction of the LED light source 101a is represented as a while a distance from the center to an edge in the horizontal direction is represented as b.

FIG. 1(b) shows a plan view of a LED light source 101b. The LED light source 101b includes two light emitting chips 1011b and fluorescent agent 1013b' provided around the chips. A distance from the center to an edge in the vertical direction of the LED light source 101b is represented as a while a distance from the center to an edge in the horizontal direction is represented as b.

FIG. 1(c) shows a plan view of a LED light source 101c. The LED light source 101c includes three light emitting chips 1011c and fluorescent agent 1013c' provided around the chips. A distance from the center to an edge in the vertical direction of the LED light source 101c is represented as a while a distance from the center to an edge in the horizontal direction is represented as b.

In the above-described examples, the shapes of the light sources in the plan views are substantially rectangular and have x-axis symmetry and y-axis symmetry. X axis is the horizontal axis which passes through the center while y axis is the vertical axis which passes through the center. Further, when the origin is set at the center of the light source in the plane of the light source, the maximum value of x coordinate in the area of the light source is b while the maximum value of y coordinate in the area of the light source is a. Further, b is greater than a.

In general, shapes of light sources in plan views are not limited to those described above. For example, the shape may be of an ellipse or a rhombus besides of a rectangle. Further, the value of a may be equal to the value of b and the shape may be of a circle or a square.

Figure 2:
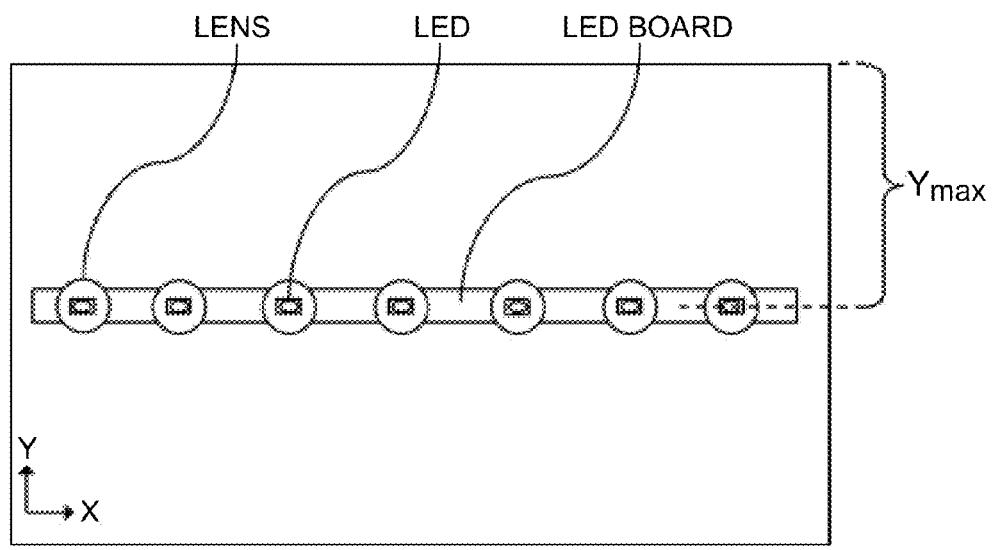
FIGS. 2(a)-2(c) show an example of a backlight illumination unit of line arrangement type which includes a single line.
Figure 2:
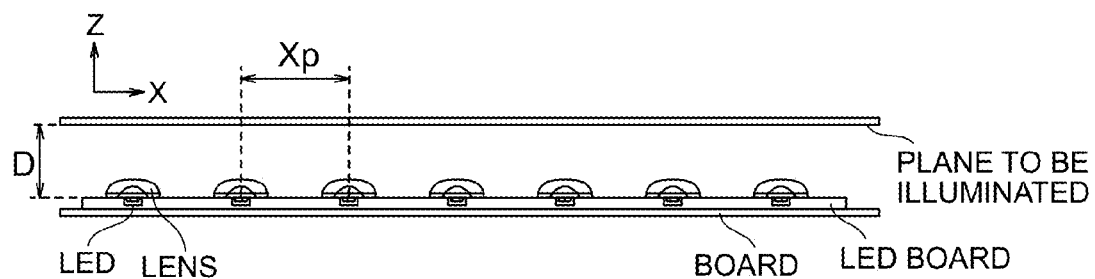
Figure 2:
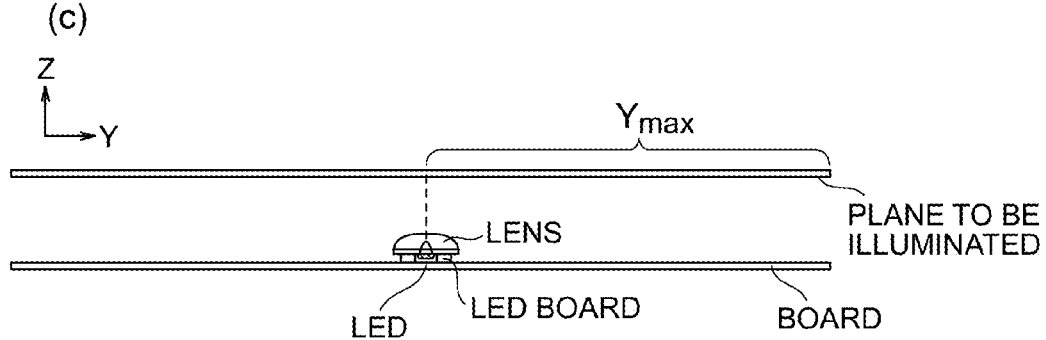

FIGS. 2(a)-2(c) show an example of a backlight illumination unit of line arrangement type which includes a single line.

FIG. 2(a) shows a plan view of the backlight illumination unit. In FIG. 2(a), x axis is set in the horizontal direction while y axis is set in the vertical direction. Plural LEDs which function light sources are arranged in a single line on a LED board and each of the LEDs is covered with a lens which is an optical element. In the present plan view, two sides of the rectangular backlight illumination unit are in the x axis direction and in the y axis direction and the line of the light sources is arranged in the x axis direction.

FIG. 2(b) shows a view in xz cross section of the backlight illumination unit. The LED board is provided on a backlight illumination unit board. As clearly shown in FIG. 2(b), the LED light sources are arranged on a surface of the LED board. Further, a plane to be illuminated is provided such that the plane is parallel to the backlight illumination unit board.

FIG. 2(c) shows a view in yz cross section of the backlight illumination unit.

Figure 3:
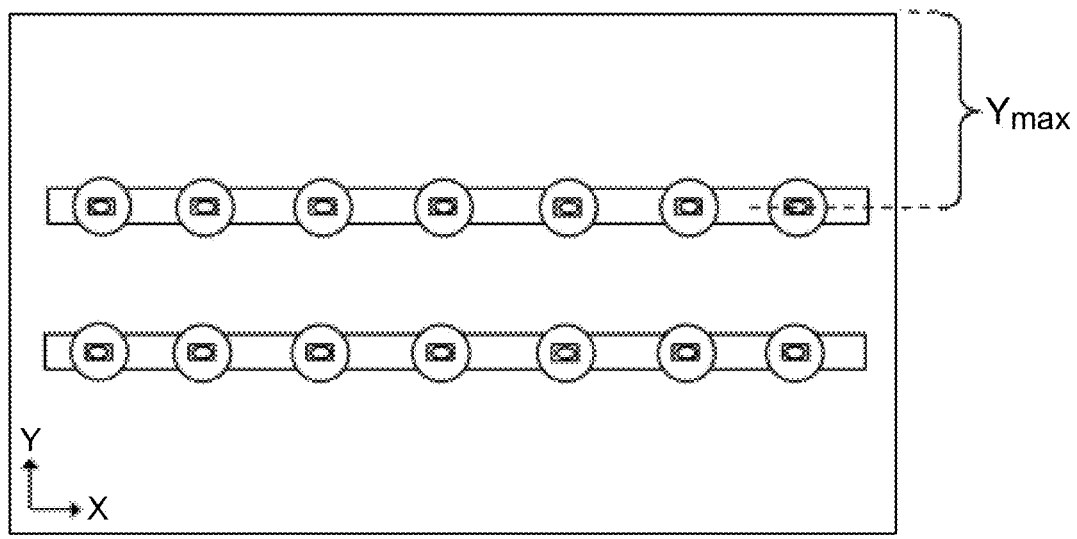
FIG. 3 shows a plan view of an example of a backlight illumination unit of line arrangement type which includes two lines.

FIG. 3 shows a plan view of an example of a backlight illumination unit of line arrangement type which includes two lines. Plural sets of a light source (LED) and an optical element (lens) are arranged in the two lines in the x axis direction.

Figure 4:
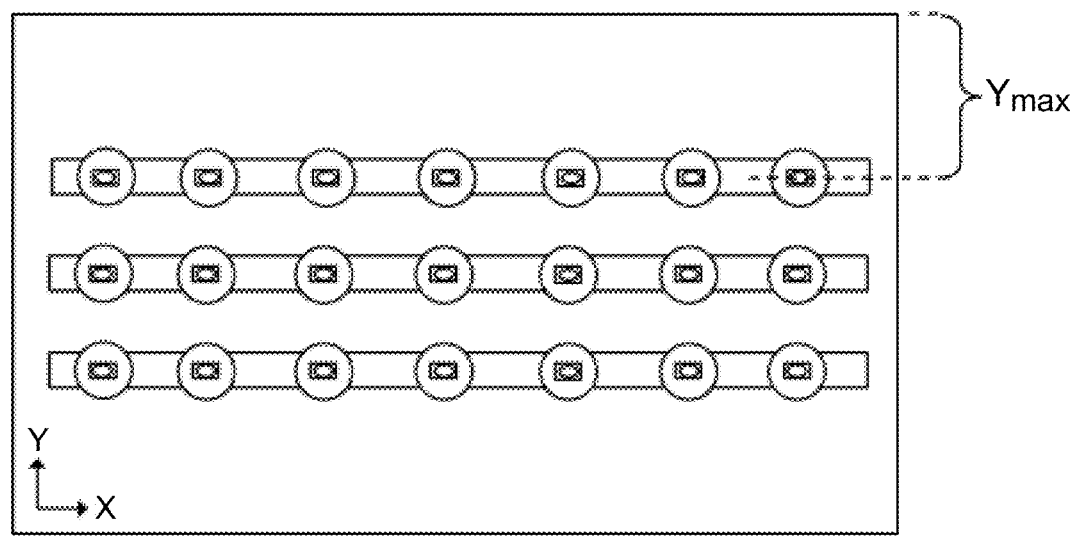
FIG. 4 shows a plan view of an example of a backlight illumination unit of line arrangement type which includes three lines.

FIG. 4 shows a plan view of an example of a backlight illumination unit of line arrangement type which includes three lines. Plural sets of a light source (LED) and an optical element (lens) are arranged in the three lines in the x axis direction.

Figure 5:
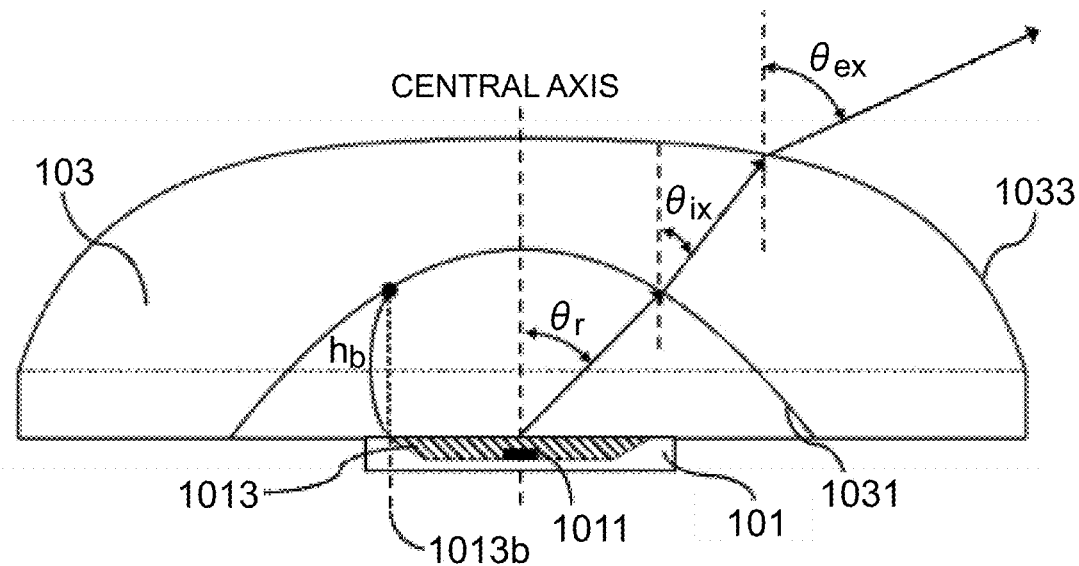
FIGS. 5(a) and 5(b) show a xz cross section of an optical element according to an embodiment of the present invention.
Figure 5:
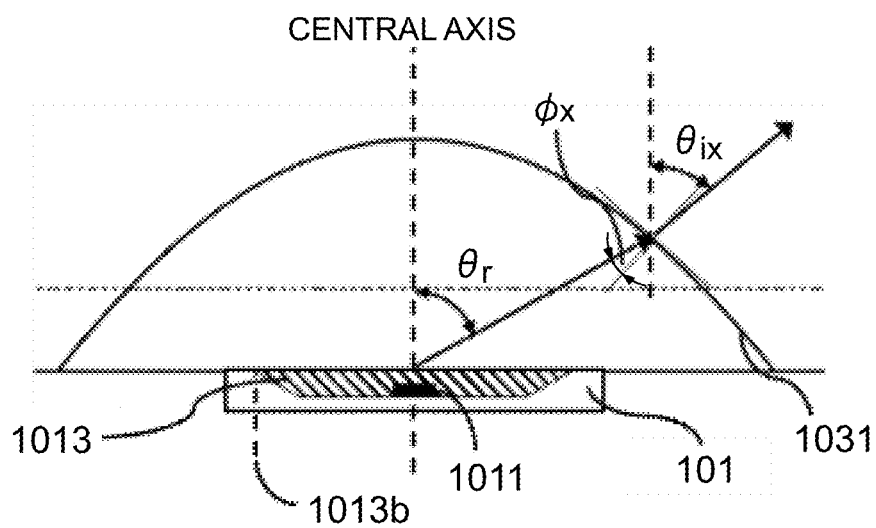

FIGS. 5(a) and 5(b) show a xz cross section of an optical element according to an embodiment of the present invention. A light receiving surface 1031 of the optical element 103 is shaped like a cap and is formed to cover a light source 101 while a light exiting surface 1033 is formed to cover the light receiving surface 1031. Lights emitted by the light emitting surface of the light source 101 are diverged by the light receiving surface 1031 and the light exiting surface 1033 and then radiated to the outside.

The coordinate system will be described below. X axis, y axis and z axis which are orthogonal to one another are determined. The light source 101 and the optical element 103 are arranged such that the central axis of the light source 101 and the central axis of the optical element 103 coincide with z axis and the surface of the light source 101 and the bottom of the optical element 103 coincide with the xy plane. If the arrangement is as described above, the top of cap of the light receiving surface 1031 is located on z axis. The shape of the light source 101 on the xy plane has x-axis symmetry and y-axis symmetry. A distance from the central axis to an edge in the x axis direction is b while a distance from the central axis to an edge in the y axis direction is a.

In the cross section shown in FIGS. 5(a) and 5(b), an angle which a virtual ray which travels from the origin in the direction which forms θr with z axis forms with the normal to the light receiving surface 1031 at the point of intersection with the light receiving surface 1031 is represented as φx, an angle which the direction in which the virtual ray travels after having passed through the light receiving surface 1031 forms with z axis is represented as θix and an angle which the direction in which the virtual ray travels after having passed through the light exiting surface 1033 forms with z axis is represented as θex.

Figure 6:
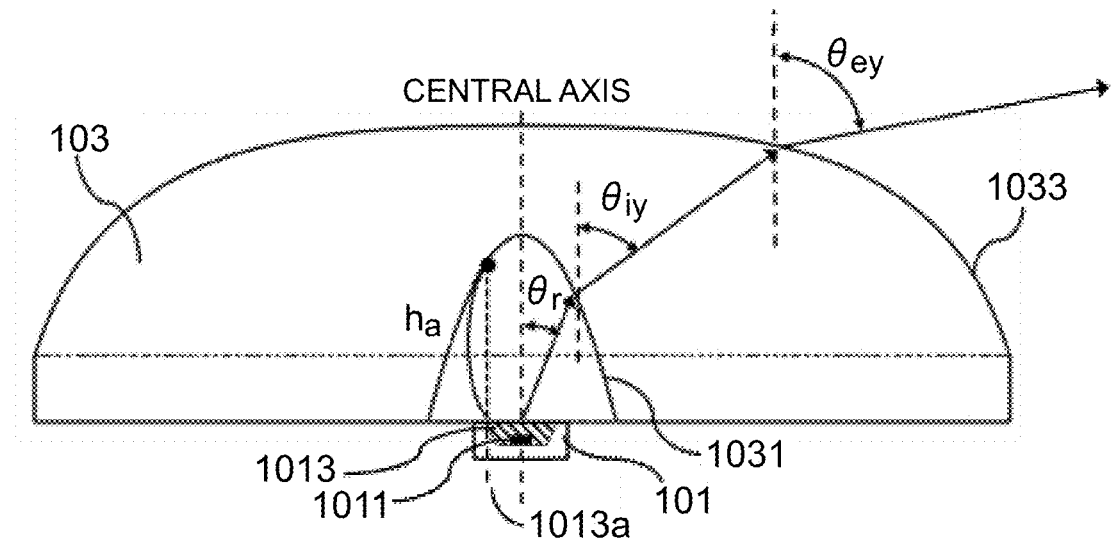
FIGS. 6(a) and 6(b) show a yz cross section of the optical element according to the embodiment of the present invention.
Figure 6:
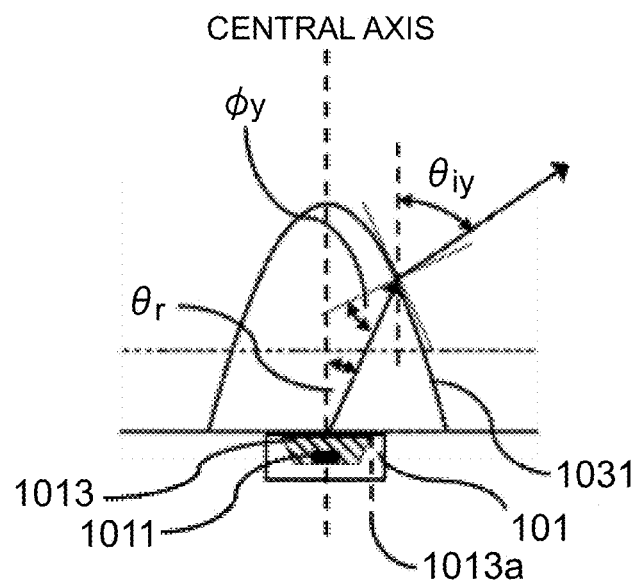

FIGS. 6(*a*) and 6(*b*) show a yz cross section of the above-described optical element.

In the cross section shown in FIGS. 6(*a*) and 6(*b*), an angle which a virtual ray which travels from the origin in the direction which forms θr with z axis forms with the normal to the light receiving surface 1031 at the point of intersection with the light receiving surface 1031 is represented as φy, an angle which the direction in which the virtual ray travels after having passed through the light receiving surface 1031 forms with z axis is represented as θiy and an angle which the direction in which the virtual ray travels after having passed through the light exiting surface 1033 forms with z axis is represented as θey.

Figure 7:
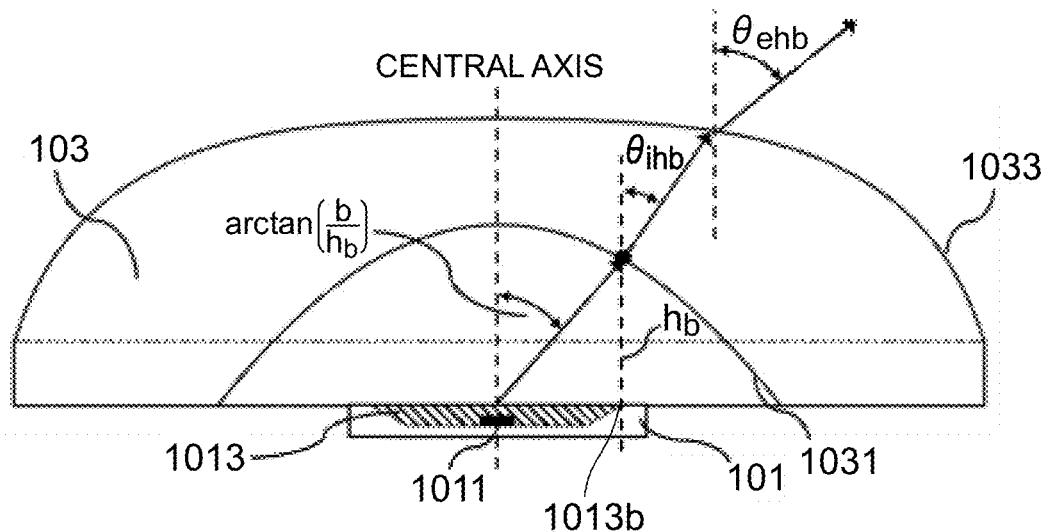
FIGS. 7(a) and 7(b) show a xz cross section of the optical element according to the embodiment of the present invention.
Figure 7:
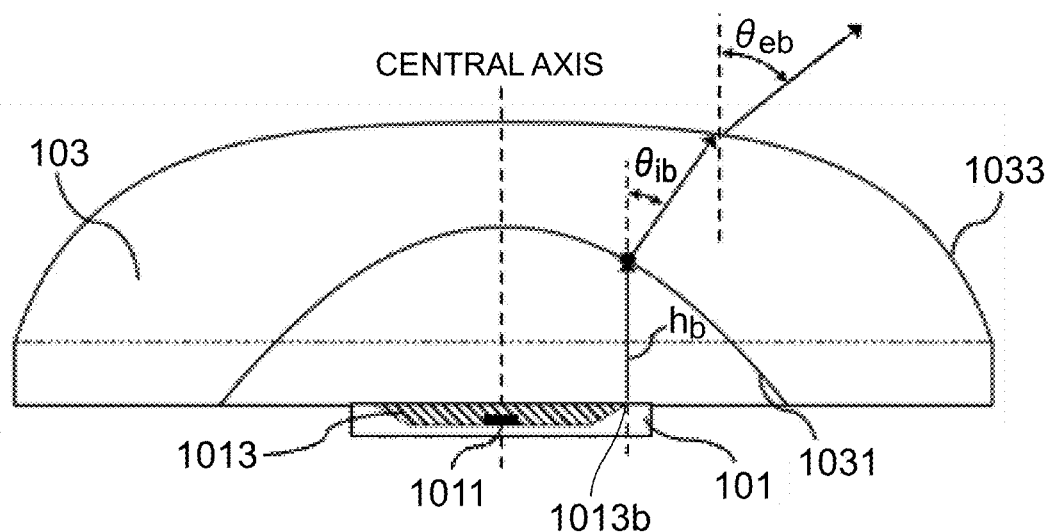

FIGS. 7(*a*) and 7(*b*) show a xz cross section of the above-described optical element.

In the cross section shown in FIGS. 7(*a*) and 7(*b*), an angle which a virtual ray which travels in the z axis direction from the point 1013*b* located at a distance of b from the origin and on x axis forms with z axis after having passed through the light receiving surface 1031 is represented as θib and an angle which the virtual ray forms with z axis after having passed through the light exiting surface 1033 is represented as θeb. Further, a distance from the point 1013*b* to the point of intersection of the normal to the xy plane at the point 1013*b* and the light receiving surface 1031 is represented as hb, an angle which a virtual ray which travels from the origin in the direction which forms the angle of arctan(b/hb) with z axis forms with z axis after having passed through the light receiving surface 1031 is represented as θihb and an angle which the virtual ray forms with z axis after having passed through the light exiting surface 1033 is represented as θehb.

Figure 8:
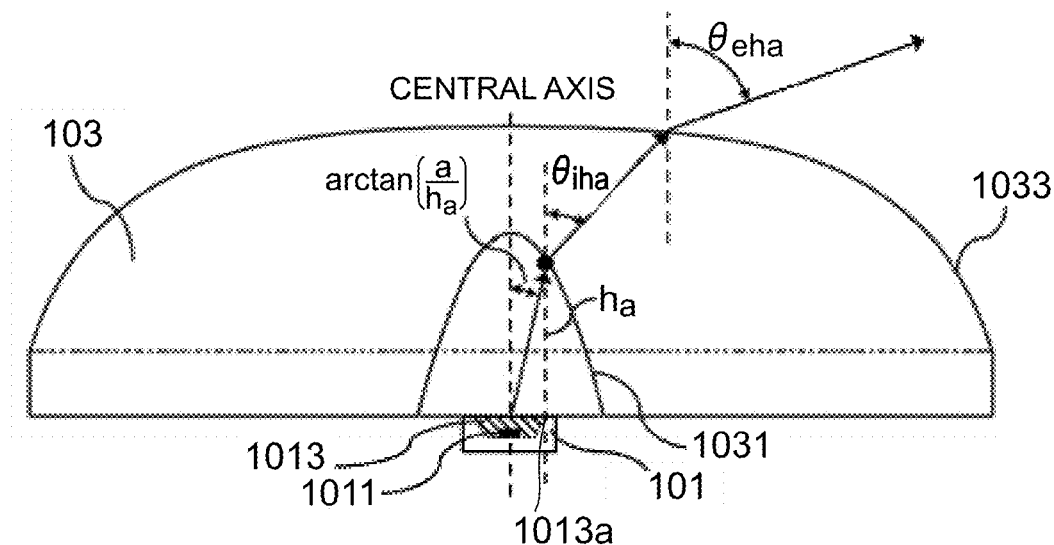
FIGS. 8(a) and 8(b) show a yz cross section of the optical element according to the embodiment of the present invention.
Figure 8:
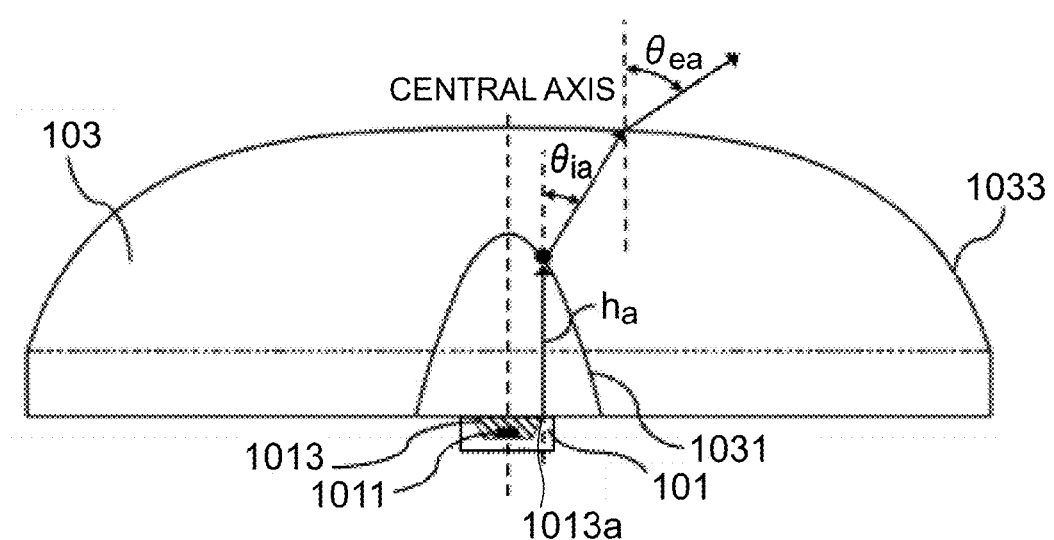

FIGS. 8(*a*) and 8(*b*) show a yz cross section of the above-described optical element.

In the cross section shown in FIGS. 8(*a*) and 8(*b*), an angle which a virtual ray which travels in the z axis direction from the point 1013*a* located at a distance of a from the origin and on y axis forms with z axis after having passed through the light receiving surface 1031 is represented as θia and an angle which the virtual ray forms with z axis after having passed through the light exiting surface 1033 is represented as θea. Further, a distance from the point 1013*a* to the point of intersection of the normal to the xy plane at the point 1013*a* and the light receiving surface 1031 is represented as ha, an angle which a virtual ray which travels from the origin in the direction which forms the angle of arctan(a/ha) with z axis forms with z axis after having passed through the light receiving surface 1031 is represented as θiha and an angle which the virtual ray forms with z axis after having passed through the light exiting surface 1033 is represented as θeha.

Optical elements according to the embodiments of the present invention will be described below.

The shape of the light receiving surface of an optical element according to an embodiment of the present invention can be expressed by the following equation.

$$z = \frac{cr^2}{1+\sqrt{1-(1+k)c^2r^2}} + \sum_{i=0}\sum_{j=0} A_{ij}\cdot x^i y^j \quad (1)$$

$$c = 1/R$$

$$r^2 = x^2 + y^2$$

z represents a distance in the z axis direction from the vertex of the light receiving surface to a point on the light receiving surface. c represents a curvature, R represents a curvature radius, k represents conic constant, and Aij represents a coefficient of a term including xy. i and j represent integers of suffixes of the coefficient.

The shape of the light exiting surface of the optical element according to an embodiment of the present invention can be expressed by the following equation.

$$z = \frac{cr^2}{1+\sqrt{1-(1+k)c^2r^2}} + \sum_{i=0}^{N} A_i r^i \quad (2)$$

$$c = 1/R$$

$$r^2 = x^2 + y^2$$

z represents a distance in the z axis direction from the vertex of the light exiting surface to a point on the light exiting surface. c represents a curvature, R represents a curvature radius, k represents conic constant, and Aij represents a coefficient of a term including xy. i and j represent integers of suffixes of the coefficient.

Refractive index of the material used for the optical elements in the following examples and comparative example is 1.49.

Letter symbols which represent dimensions of the light source and optical element in the following examples and comparative example are below.

a a distance from the center (the origin) to an edge in the y axis direction of the light source b a distance from the center (the origin) to an edge in the x axis direction of the light source T a thickness along the z axis (the central axis) of the optical element h a distance from the center (the origin) of the light source to the vertex of the light receiving surface ha a distance from the point at an edge in the y axis direction of the light source (point 1013*a*) to the point of intersection of the normal to the xy plane at the point (1013*a*) and the light receiving surface hb a distance from the point at the edge in the x axis direction of the light source (point 1013*b*) to the point of intersection of the normal to the xy plane at the point (1013*b*) and the light receiving surface In the examples and comparative example, the unit of length is millimeter unless designated otherwise.

Example 1

Table 1 shows dimensions of the light source and the optical element of Example 1.

TABLE 1

| | |
|---|---|
| a | 1.25 |
| b | 2.50 |

TABLE 1-continued

| | |
|---|---|
| T | 1.496 |
| h | 4.123 |
| ha | 1.562 |
| hb | 2.819 |

Table 2 shows values of coefficients of Equation (1) which represents the light receiving surface of the optical element of Example 1. The coefficients which are not shown in the table are zero.

TABLE 2

| Coefficients | Light receiving surface |
|---|---|
| c | −0.547 |
| k | −1.120 |
| A02 | 1.122 |
| A04 | 0.122 |
| A06 | 7.709E−10 |

Table 3 shows values of coefficients of Equation (2) which represents the light exiting surface of the optical element of Example 1. The coefficients which are not shown in the table are zero.

TABLE 3

| Coefficients | Light exiting surface |
|---|---|
| c | 0.0247 |
| k | −4.583 |
| A2 | 3.638E−03 |
| A3 | 2.446E−04 |
| A4 | 1.359E−04 |
| A5 | 5.064E−06 |
| A6 | 2.208E−06 |
| A7 | −3.484E−08 |
| A8 | −9.437E−09 |
| A9 | −5.642E−11 |
| A10 | −2.010E−10 |
| A12 | 1.588E−12 |

Figure 9:
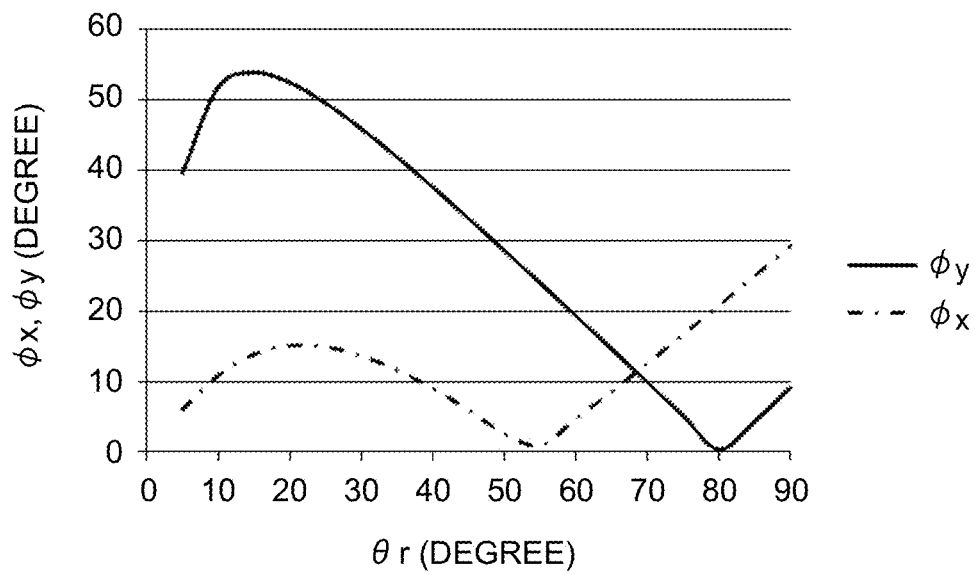
FIG. 9 shows a relationship between θr and φx and a relationship between θr and φy of the optical element of Example 1.

FIG. 9 shows a relationship between $\theta r$ and $\varphi x$ and a relationship between $\theta r$ and $\varphi y$ of the optical element of Example 1. The horizontal axis of FIG. 9 shows $\theta r$ while the vertical axis of FIG. 9 shows $\varphi x$ and $\varphi y$. In the range $0<\theta r<60°$, the following relationship holds.

$\varphi_y > \varphi_x$

Figure 10:
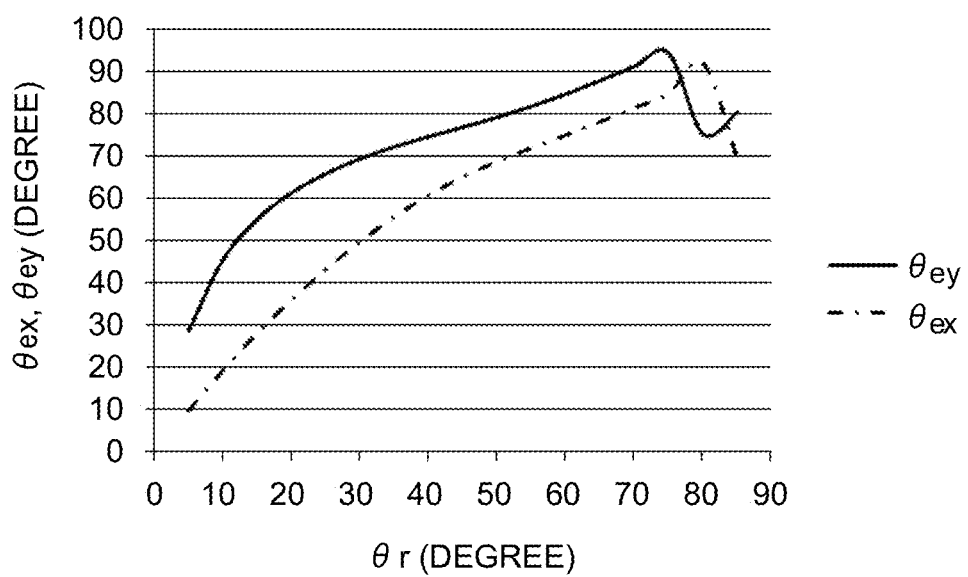
FIG. 10 shows a relationship between θr and θex and a relationship between θr and θey of the optical element of Example 1.

FIG. 10 shows a relationship between $\theta r$ and $\theta ex$ and a relationship between $\theta r$ and $\theta ey$ of the optical element of Example 1. The horizontal axis of FIG. 10 shows $\theta r$ while the vertical axis of FIG. 10 shows $\theta ex$ and $\theta ey$. In the range $0<\theta r<60°$, the following relationship holds.

$\theta_{ex} > \theta_r$ $\theta_{ey} > \theta_r$

Table 4 shows parameters relating to rays of the optical element of Example 1.

TABLE 4

| | Example 1 |
|---|---|
| $\theta ia$ | 36.7° |
| tan ($\theta ia$) | 0.746 |

TABLE 4-continued

| | Example 1 |
|---|---|
| $\theta ib$ | 18.3° |
| tan ($\theta ib$) | 0.331 |
| $\theta ea$ | 51.4° |
| tan ($\theta ea$) | 1.252 |
| $\theta eha$ | 74.1° |
| tan ($\theta eha$) | 3.511 |

Figure 11:
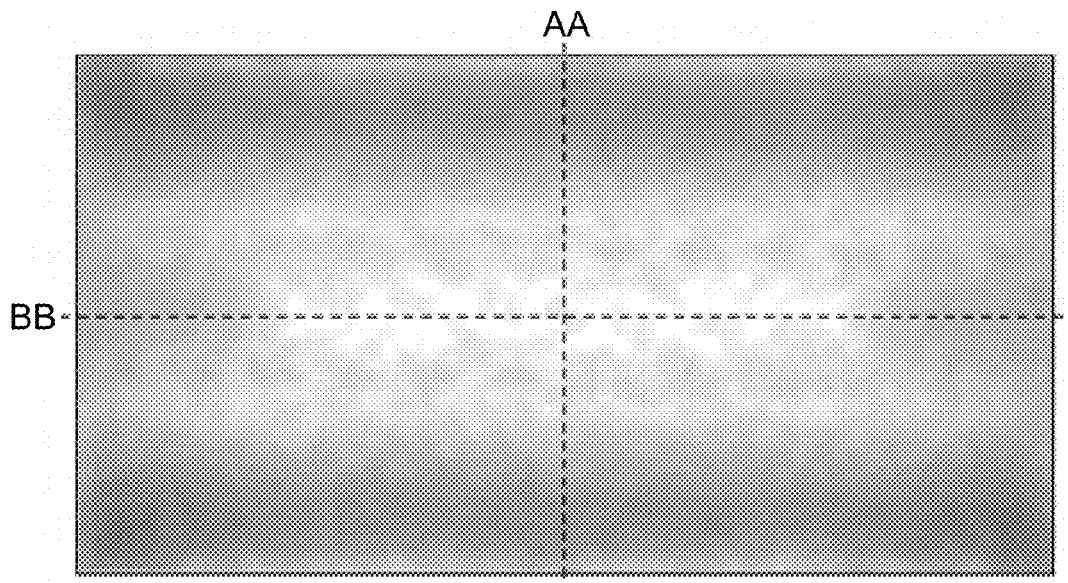
FIG. 11 shows illuminance on a plane illuminated by an illumination unit which uses the optical elements of Example 1.

FIG. 11 shows illuminance on a plane illuminated by an illumination unit which uses the optical elements of Example 1. The present illumination unit is configured such that light sources including the optical elements are arranged in a single line as shown in FIGS. 2(a)-2(c). The board on which the optical elements are arranged and the plane to be illuminated are rectangular and identical in dimensions to each other. Length in the x axis direction (the horizontal direction in FIGS. 2(a)-2(c) and FIG. 11) of the rectangle is 800 millimeters while length in the y axis direction (the vertical direction in FIGS. 2(a)-2(c) and FIG. 11) of the rectangle is 450 millimeters. The line of the light sources including the optical elements is in the x axis direction and located at the center in the y axis direction. The number of the light sources including the optical elements is 12 and the center of each of the light sources is at a distance of 64 millimeters away from the center of adjacent one. Further, a distance from the light sources to the plane to be illuminated is 60 millimeters.

In FIG. 11, the darker in the color, the lower the illuminance is while the lighter in the color, the higher the illuminance is.

Figure 12:
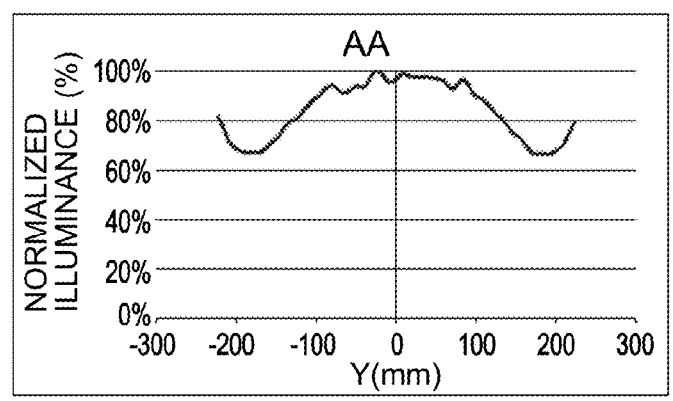
FIG. 12 shows illuminance in the yz cross section AA which passes through the center of the plane to be illuminated.

FIG. 12 shows illuminance in the yz cross section AA which passes through the center of the plane to be illuminated. The horizontal axis of FIG. 12 represents coordinate in the y axis direction while the vertical axis of FIG. 12 represents normalized illuminance which is determined such that the maximum illuminance is set to 100%.

According to FIG. 12, a difference between the illuminance at the center in the y axis direction and the illuminance at an edge in the y axis direction is less than 35% when the optical element of Example 1 is used.

Figure 13:
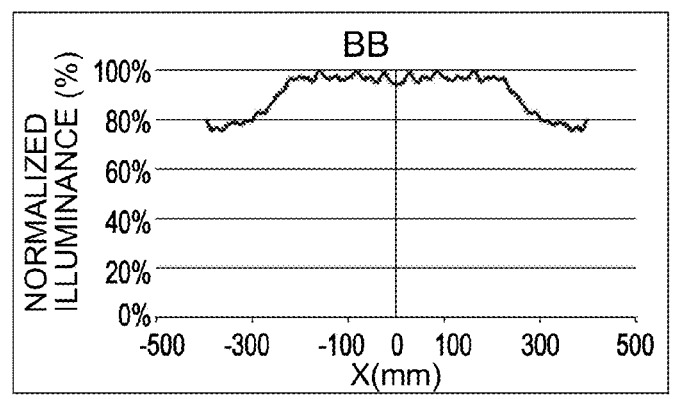
FIG. 13 shows illuminance in the xz cross section BB which passes through the center of the plane to be illuminated.

FIG. 13 shows illuminance in the xz cross section BB which passes through the center of the plane to be illuminated. The horizontal axis of FIG. 13 represents coordinate in the x axis direction while the vertical axis of FIG. 13 represents normalized illuminance which is determined such that the maximum illuminance is set to 100%.

According to FIG. 13, a difference between the illuminance at the center in the x axis direction and the illuminance at an edge in the x axis direction is approximately 20% when the optical element of Example 1 is used.

Comparative Example

The comparative example of Example 1 will be described.
Table 5 shows dimensions of the light source and the optical element of the comparative example.

TABLE 5

| | |
|---|---|
| a | 1.25 |
| b | 2.50 |
| T | 1.496 |
| h | 4.123 |
| ha | 3.688 |
| hb | 2.819 |

The shape of the light receiving surface of an optical element of the comparative example can be expressed by the following equation.

$$z = \frac{cr^2}{1+\sqrt{1-(1+k)c^2r^2}} \quad (3)$$
$$c = 1/R$$
$$r^2 = x^2 + y^2$$

z represents a distance in the z axis direction from the vertex of the light receiving surface to a point on the light receiving surface. c represents a curvature, R represents a curvature radius, and k represents conic constant.

As is evident from Equation (3), the light receiving surface of the optical element of the comparative example has a shape which is symmetric about z axis. The light exiting surface of the optical element of the comparative example has the shape which is identical with the shape of the optical element of Example 1.

Table 6 shows values of coefficients of Equation (3) which represents the light receiving surface of the optical element of the comparative example.

TABLE 6

| Coefficient | Light receiving surface |
|---|---|
| C | −0.547 |
| K | −1.120 |

Table 7 shows values of coefficients of Equation (2) which represents the light exiting surface of the optical element of the comparative example. The coefficients which are not shown in the table are zero.

TABLE 7

| Coefficient | Light exiting surface |
|---|---|
| C | 0.0247 |
| K | −4.583 |
| A02 | 3.638E−03 |
| A03 | 2.446E−04 |
| A04 | 1.359E−04 |
| A05 | 5.064E−06 |
| A06 | 2.208E−06 |
| A07 | −3.484E−08 |
| A08 | −9.437E−09 |
| A09 | −5.642E−11 |
| A10 | −2.010E−10 |
| A12 | 1.588E−12 |

Table 8 shows parameters relating to rays of the optical element of the comparative example.

TABLE 8

| | Comparative example |
|---|---|
| $\theta_{ia}$ | 12.0° |
| tan ($\theta_{ia}$) | 0.213 |
| $\theta_{ib}$ | 18.3° |
| tan ($\theta_{ib}$) | 0.331 |
| $\theta_{ea}$ | 16.4° |
| tan ($\theta_{ea}$) | 0.294 |

TABLE 8-continued

| | Comparative example |
|---|---|
| $\theta_{eha}$ | 34.5° |
| tan ($\theta_{eha}$) | 0.687 |

When Table 4 is compared with Table 8, $\theta_{ea}$ and $\theta_{eha}$ (See FIG. 8) of the optical element of Example 1 are far larger than $\theta_{ea}$ and $\theta_{eha}$ of the optical element of the comparative example. Accordingly, the optical element of Example 1 is capable of diverging lights more widely along y axis in comparison with the optical element of the comparative example.

Figure 14:
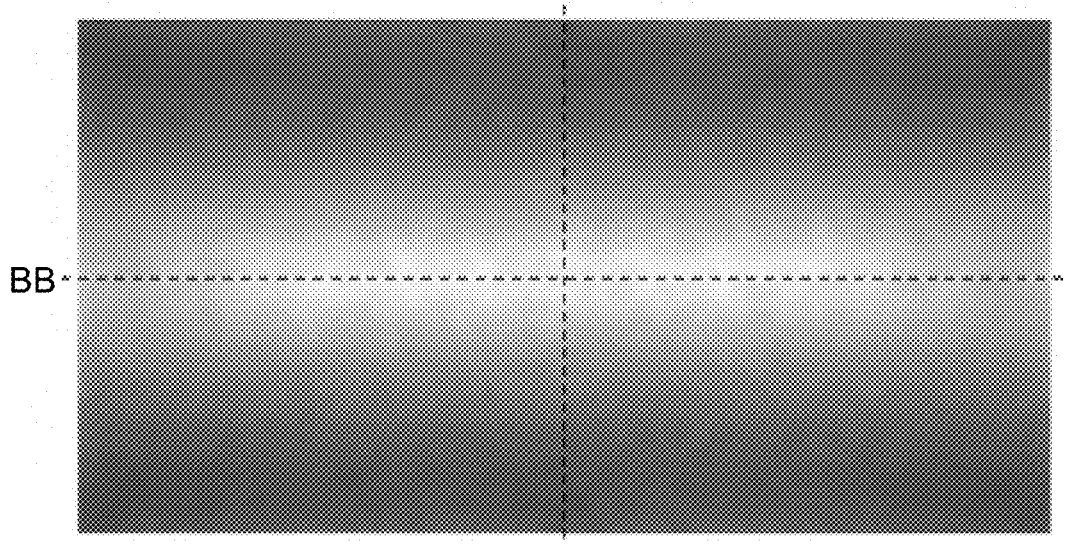
FIG. 14 shows illuminance on a plane illuminated by an illumination unit which uses the optical elements of the comparative example.

FIG. 14 shows illuminance on a plane illuminated by an illumination unit which uses the optical elements of the comparative example. The illumination unit is configured in the same way as the illumination unit using the optical elements of Example 1, which has been described with FIG. 11.

In FIG. 14, the darker in the color, the lower the illuminance is while the lighter in the color, the higher the illuminance is.

Figure 15:
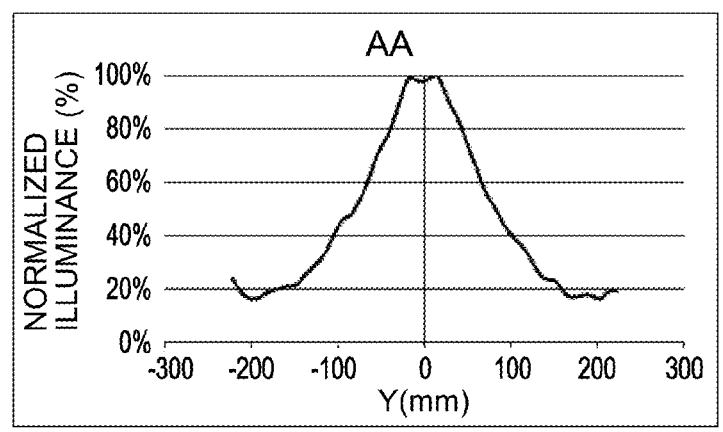
FIG. 15 shows illuminance in the yz cross section AA which passes through the center of the plane to be illuminated.

FIG. 15 shows illuminance in the yz cross section AA which passes through the center of the plane to be illuminated. The horizontal axis of FIG. 15 represents coordinate in the y axis direction while the vertical axis of FIG. 15 represents normalized illuminance which is determined such that the maximum illuminance is set to 100%.

Figure 16:
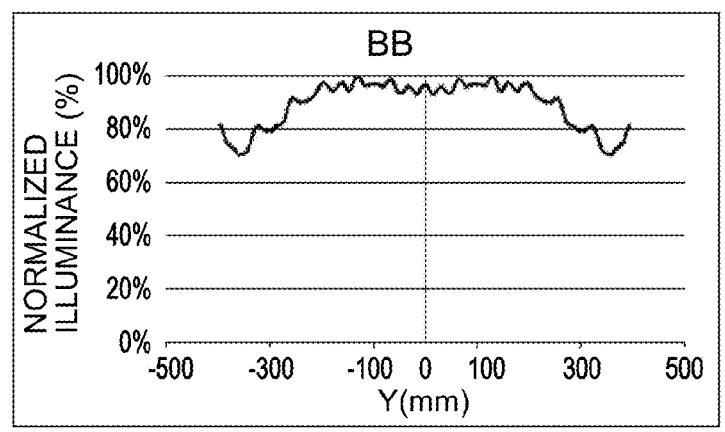
FIG. 16 shows illuminance in the xz cross section which passes through the center of the plane to be illuminated.

FIG. 16 shows illuminance in the xz cross section which passes through the center of the plane to be illuminated. The horizontal axis of FIG. 16 represents coordinate in the x axis direction while the vertical axis of FIG. 16 represents normalized illuminance which is determined such that the maximum illuminance is set to 100%.

Comparing FIG. 12 which shows illuminance with the optical element of Example 1 with FIG. 15 which shows illuminance with the optical element of the comparative example, a difference between illuminance at the center in the y axis direction and illuminance at an edge in the y axis direction in the case of the optical element of Example 1 shown in FIG. 12 is less than 35% while a difference between illuminance at the center in the y axis direction and illuminance at an edge in the y axis direction in the case of the optical element of the comparative example shown in FIG. 15 is greater than 80%. That is, the optical element of Example 1 which diverges lights more widely along y axis permits illumination which is far more uniform than illumination with the optical element of the comparative example.

Example 2

Table 9 shows dimensions of the light source and the optical element of Example 2.

TABLE 9

| a | 0.80 |
|---|---|
| b | 3.00 |
| T | 2.328 |
| h | 3.156 |
| ha | 2.320 |
| hb | 0.899 |

Table 10 shows values of coefficients of Equation (1) which represents the light receiving surface of the optical element of Example 2. The coefficients which are not shown in the table are zero.

TABLE 10

| Coefficients | Light receiving surface |
| --- | --- |
| c | −0.525 |
| k | −1.077 |
| A02 | 0.969 |
| A04 | 0.118 |

Table 11 shows values of coefficients of Equation (2) which represents the light exiting surface of the optical element of Example 2. The coefficients which are not shown in the table are zero.

TABLE 11

| Coefficients | Light exiting surface |
| --- | --- |
| c | −0.1898 |
| k | −26.459 |
| A2 | −2.669E−02 |
| A3 | 2.004E−03 |
| A4 | −2.014E−04 |
| A5 | −6.360E−07 |
| A6 | −1.604E−06 |
| A8 | 5.289E−10 |
| A10 | 2.952E−12 |

Figure 17:
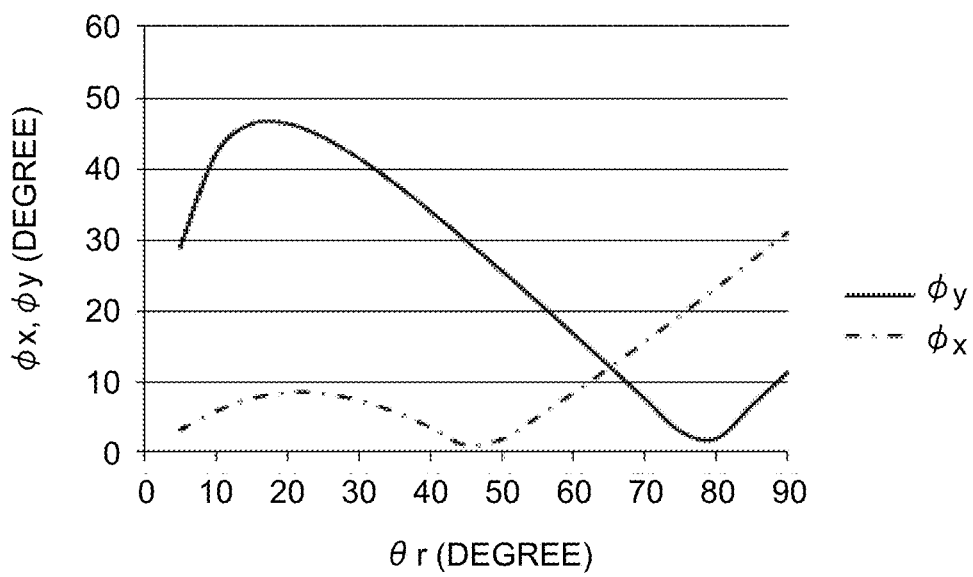
FIG. 17 shows a relationship between θr and φx and a relationship between θr and φy of the optical element of Example 2.

FIG. 17 shows a relationship between $\theta r$ and $\varphi x$ and a relationship between $\theta r$ and $\varphi y$ of the optical element of Example 2. The horizontal axis of FIG. 17 shows $\theta r$ while the vertical axis of FIG. 17 shows $\varphi x$ and $\varphi y$. In the range $0<\theta r<60°$, the following relationship holds.

$\varphi_y > \varphi_x$

Figure 18:
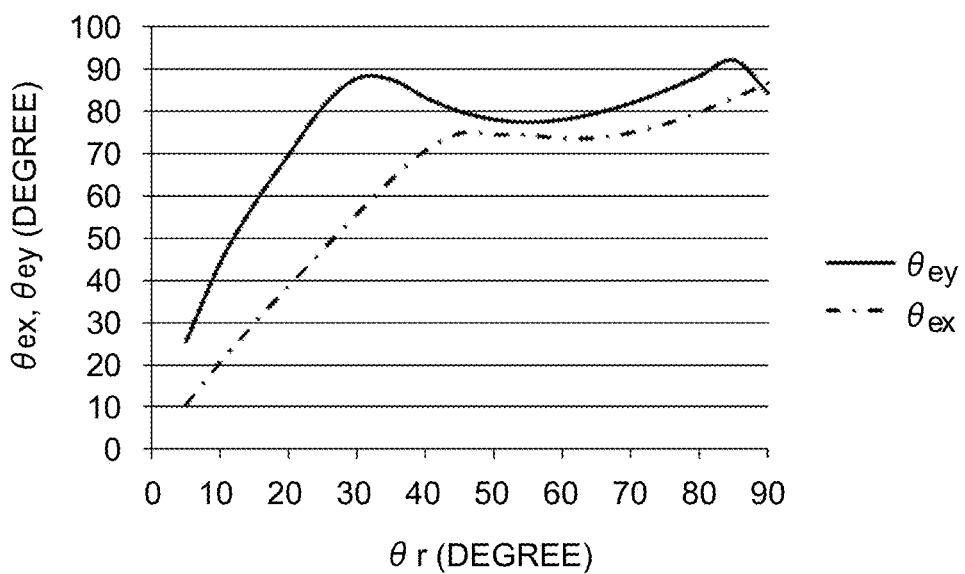
FIG. 18 shows a relationship between θr and θex and a relationship between θr and θey of the optical element of Example 2.

FIG. 18 shows a relationship between $\theta r$ and $\theta ex$ and a relationship between $\theta r$ and $\theta ey$ of the optical element of Example 2. In the range $0<\theta r<60°$, the following relationship holds.

$\theta_{ex} > \theta_r$ $\theta_{ey} > \theta_r$

Table 12 shows parameters relating to rays of the optical element of Example 2.

TABLE 12

|  | Example 2 |
| --- | --- |
| Θia | 28.1° |
| tan (θia) | 0.533 |
| θib | 21.9° |
| tan (θib) | 0.402 |
| θea | 48.5° |
| tan (θea) | 1.131 |
| θeha | 67.6° |
| tan (θeha) | 2.426 |

Figure 19:
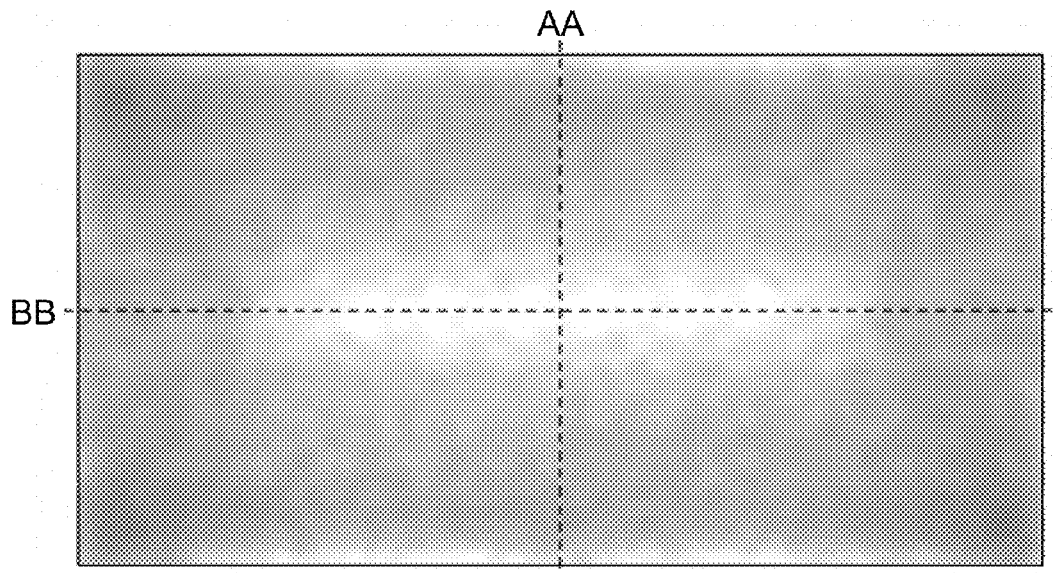
FIG. 19 shows illuminance on a plane illuminated by an illumination unit which uses the optical elements of Example 2.

FIG. 19 shows illuminance on a plane illuminated by an illumination unit which uses the optical elements of Example 2. The illumination unit is configured in the same way as the illumination unit using the optical element of Example 1, which has been described using FIG. 11.

In FIG. 19, the darker in the color, the lower the illuminance is while the lighter in the color, the higher the illuminance is.

Figure 20:
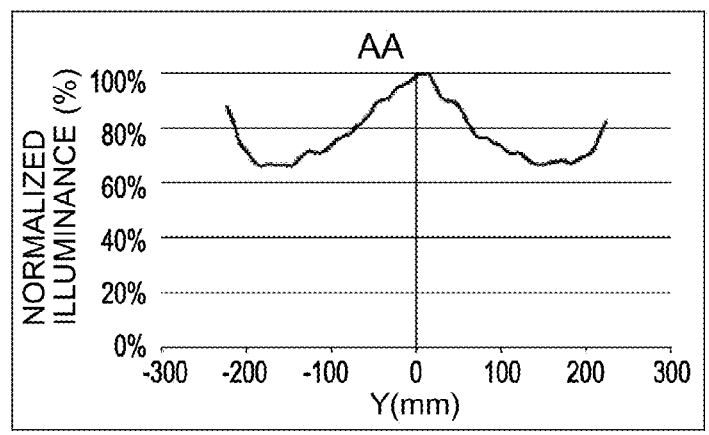
FIG. 20 shows illuminance in the yz cross section AA which passes through the center of the plane to be illuminated.

FIG. 20 shows illuminance in the yz cross section AA which passes through the center of the plane to be illuminated. The horizontal axis of FIG. 20 represents coordinate in the y axis direction while the vertical axis of FIG. 20 represents normalized illuminance which is determined such that the maximum illuminance is set to 100%.

According to FIG. 20, a difference between the illuminance at the center in the y axis direction and the illuminance at an edge in the y axis direction is less than 35% when the optical element of Example 2 is used.

Figure 21:
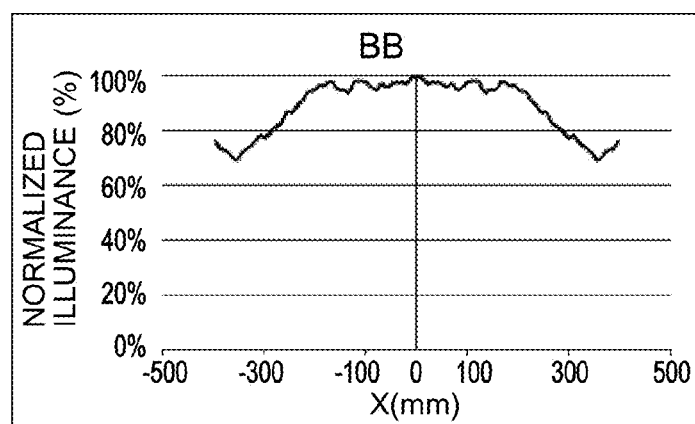
FIG. 21 shows illuminance in the xz cross section BB which passes through the center of the plane to be illuminated.

FIG. 21 shows illuminance in the xz cross section BB which passes through the center of the plane to be illuminated. The horizontal axis of FIG. 21 represents coordinate in the x axis direction while the vertical axis of FIG. 21 represents normalized illuminance which is determined such that the maximum illuminance is set to 100%.

According to FIG. 21, a difference between the illuminance at the center in the x axis direction and the illuminance at an edge in the x axis direction is approximately 30% when the optical element of Example 2 is used.

Example 3

Table 13 shows dimensions of the light source and the optical element of Example 3.

TABLE 13

| A | 1.27 |
| --- | --- |
| B | 2.23 |
| T | 1.000 |
| H | 4.887 |
| Ha | 3.000 |
| Hb | 3.311 |

Table 14 shows values of coefficients of Equation (1) which represents the light receiving surface of the optical element of Example 3. The coefficients which are not shown in the table are zero.

TABLE 14

| Coefficients | Light receiving surface |
| --- | --- |
| C | −1.151 |
| K | −0.948 |
| A20 | −0.338 |
| A02 | 0.622 |
| A40 | 0.012 |
| A22 | −1.001E−04 |
| A04 | −0.028 |
| A60 | −1.669E−03 |

Table 15 shows values of coefficients of Equation (2) which represents the light exiting surface of the optical element of Example 3. The coefficients which are not shown in the table are zero.

TABLE 15

| Coefficients | Light exiting surface |
| --- | --- |
| C | 0.0281 |
| K | −1.206 |
| A02 | 1.636E−03 |
| A03 | −7.961E−04 |
| A04 | 8.571E−05 |
| A05 | −5.561E−06 |
| A06 | 2.543E−06 |
| A07 | −7.096E−08 |
| A08 | 1.968E−09 |
| A09 | 1.419E−09 |

TABLE 15-continued

| Coefficients | Light exiting surface |
|---|---|
| A10 | 1.655E−10 |
| A12 | 1.588E−12 |

Figure 22:
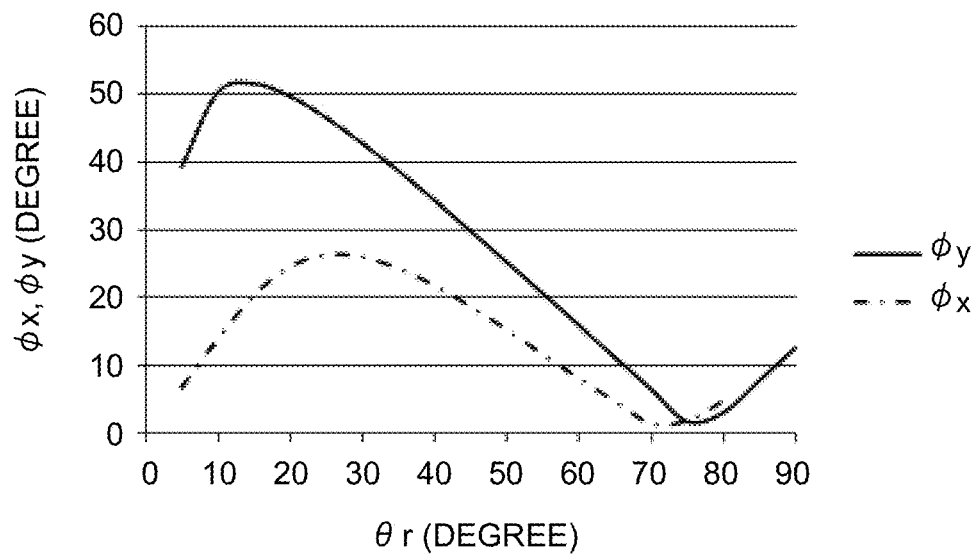
FIG. 22 shows a relationship between θr and φx and a relationship between θr and φy of the optical element of Example 3.

FIG. 22 shows a relationship between θr and φx and a relationship between θr and φy of the optical element of Example 3. The horizontal axis of FIG. 22 shows θr while the vertical axis of FIG. 22 shows φx and φy. In the range 0<θr<60°, the following relationship holds.

$\varphi_y > \varphi_x$

Figure 23:
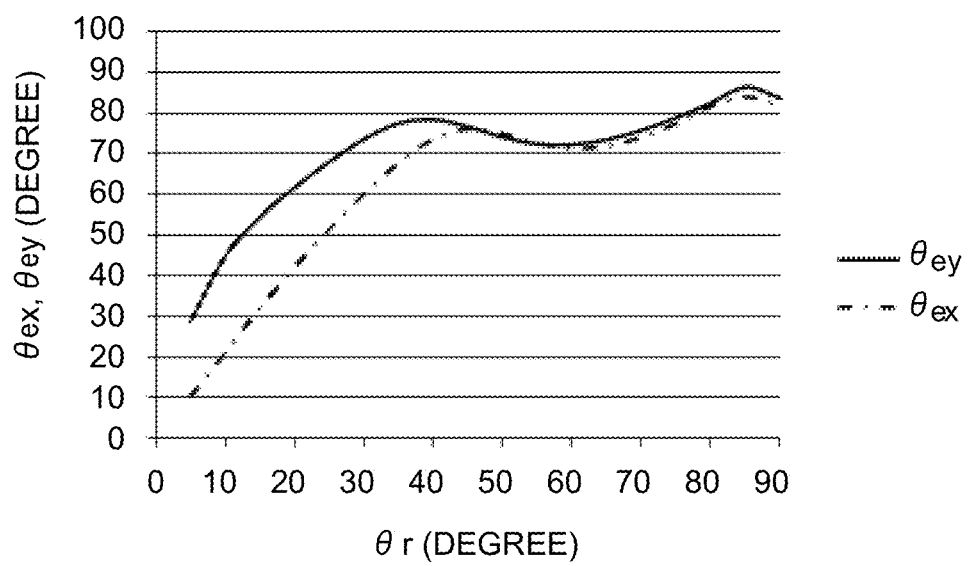
FIG. 23 shows a relationship between θr and θex and a relationship between θr and θey of the optical element of Example 3.

FIG. 23 shows a relationship between θr and θex and a relationship between θr and θey of the optical element of Example 3. In the range 0<θr<60°, the following relationship holds.

$\theta_{ex} > \theta_r$ $\theta_{ey} > \theta_r$

Table 16 shows parameters relating to rays of the optical element of Example 3.

TABLE 16

|  | Example 3 |
|---|---|
| θia | 31.7° |
| tan (θia) | 0.618 |
| θib | 23.8° |
| tan (θib) | 0.440 |
| θea | 47.4° |
| tan (θea) | 1.089 |
| θeha | 65.4° |
| tan (θeha) | 2.184 |

Figure 24:
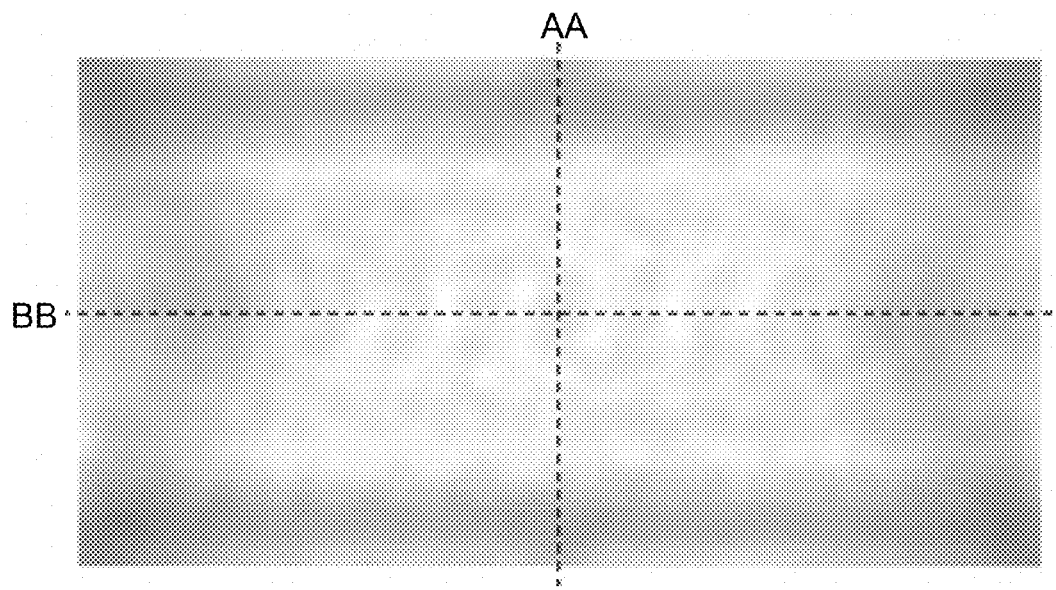
FIG. 24 shows illuminance on a plane illuminated by an illumination unit which uses the optical elements of Example 3.

FIG. 24 shows illuminance on a plane illuminated by an illumination unit which uses the optical elements of Example 3. The illumination unit is configured in the same way as the illumination unit using the optical element of Example 1, which has been described using FIG. 11.

In FIG. 24, the darker in the color, the lower the illuminance is while the lighter in the color, the higher the illuminance is.

Figure 25:
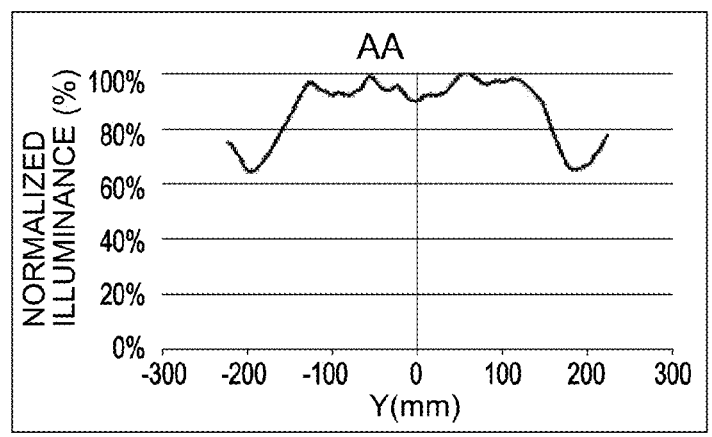
FIG. 25 shows illuminance in the yz cross section AA which passes through the center of the plane to be illuminated.

FIG. 25 shows illuminance in the yz cross section AA which passes through the center of the plane to be illuminated. The horizontal axis of FIG. 25 represents coordinate in the y axis direction while the vertical axis of FIG. 25 represents normalized illuminance which is determined such that the maximum illuminance is set to 100%.

According to FIG. 25, a difference between the illuminance at the center in the y axis direction and the illuminance at an edge in the y axis direction is approximately 35% when the optical element of Example 3 is used.

Figure 26:
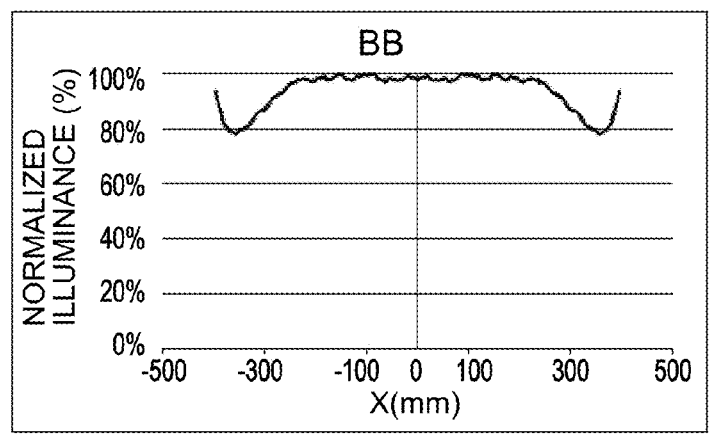
FIG. 26 shows illuminance in the xz cross section BB which passes through the center of the plane to be illuminated.

FIG. 26 shows illuminance in the xz cross section BB which passes through the center of the plane to be illuminated. The horizontal axis of FIG. 26 represents coordinate in the x axis direction while the vertical axis of FIG. 26 represents normalized illuminance which is determined such that the maximum illuminance is set to 100%.

According to FIG. 26, a difference between the illuminance at the center in the x axis direction and the illuminance at an edge in the x axis direction is approximately 20% when the optical element of Example 3 is used.

Summary of the Examples

Table 17 shows parameters relating to rays of the optical element of the examples and the comparative example.

n represents refractive index of a material of the optical elements. D represents distance in the z axis direction between the light source and the plane to be illuminated (See FIGS. 2(a)-2(c)). Ymax represents distance in the y axis direction between a side in the x axis direction of the illumination unit and the center of the line of illumination devices, which is the closest to the side (See FIGS. 2(a)-2(c)). Xp represents intervals in the x axis direction between centers of illumination devices of the illumination unit (See FIGS. 2(a)-2(c)).

TABLE 17

|  | Example 1 | Example 2 | Example 3 | Comparative example 1 |
|---|---|---|---|---|
| n | 1.49 | 1.49 | 1.49 | 1.49 |
| D | 60 mm | 60 mm | 60 mm | 60 mm |
| $Y_{max}$ | 225 mm | 225 mm | 225 mm | 225 mm |
| $Y_{max}/D$ | 3.75 | 3.75 | 3.75 | 3.75 |
| $X_p$ | 64 mm | 64 mm | 64 mm | 64 mm |
| $X_p/D$ | 1.067 | 1.067 | 1.067 | 1.067 |
| a | 1.250 mm | 0.800 mm | 1.270 mm | 1.250 mm |
| b | 2.500 mm | 3.000 mm | 2.230 mm | 2.500 mm |
| $h_a$ | 1.562 mm | 2.320 mm | 3.000 mm | 3.688 mm |
| $h_b$ | 2.819 mm | 0.899 mm | 3.311 mm | 2.819 mm |
| $\theta_{ia}$ | 36.7° | 28.1° | 31.7° | 12.0° |
| tan ($\theta_{ia}$) | 0.746 | 0.533 | 0.618 | 0.213 |
| $\theta_{ib}$ | 18.3° | 21.9° | 23.8° | 18.3° |
| tan ($\theta_{ib}$) | 0.331 | 0.402 | 0.440 | 0.331 |
| $\theta_{ea}$ | 51.4° | 48.5° | 47.4° | 16.4° |
| tan ($\theta_{ea}$) | 1.252 | 1.131 | 1.089 | 0.294 |
| $\theta_{eb}$ | 23.9° | 32.0° | 33.5° | 23.9° |
| tan ($\theta_{eb}$) | 0.443 | 0.625 | 0.663 | 0.443 |
| $\theta_{eha}$ | 74.1° | 67.6° | 65.4° | 34.5° |
| tan ($\theta_{eha}$) | 3.511 | 2.426 | 2.184 | 0.687 |
| $\theta_{ehb}$ | 60.2° | 77.3° | 67.5° | 60.2° |
| tan ($\theta_{ehb}$) | 1.746 | 4.437 | 2.414 | 1.746 |

Parameters relating to rays of the optical element of the Examples 1 to 3 satisfy the following relationships.

$$\theta_{eha} > 45° \qquad (4)$$

$$\theta_{ea} > 45° \qquad (5)$$

$$\theta_{ia} > \theta_{ib} \qquad (6)$$

$$\tan(\theta_{eha}) > 2 \qquad (7)$$

Inequalities (4), (5) and (7) represent conditions that lights are sufficiently diverged in the y axis direction by the optical element. Inequality (6) represents that a ray which travels in the direction perpendicular to the xy plane from an edge in the y axis direction of the light source diverges at the light receiving surface more widely in the y axis direction than a ray which travels in the direction perpendicular to the xy plane from an edge in the x axis direction of the light source diverges at the light receiving surface in the x axis direction. On the other hand, in the optical element of the comparative example, any of Inequalities (4) to (7) is not satisfied.

Further, parameters relating to the illumination unit satisfy the following relationships.

$$\frac{Y_{max}}{D} > \tan(\theta_{eha}) \qquad (8)$$

$$\frac{X_p}{D} > \tan(\theta_{eb}) \qquad (9)$$

Inequality (8) determines the upper limit of divergence of rays in the y axis direction of optical elements in the illumination unit. When rays are diverged in the y axis direction beyond the upper limit of Inequality (8), the outside of the plane to be illuminated is illuminated by rays and therefore the illumination efficiency will deteriorate. Inequality (9) determines the upper limit of divergence of rays in the x axis direction of optical elements in the illumination unit. In the illumination unit plural light sources are arranged in the x axis direction, and a high uniformity of illuminance along the x axis direction is required. Accordingly, uniformity of illuminance along the x axis direction is enhanced by determining the upper limit of divergence $\theta_{eb}$ in the x axis direction at the light receiving surface of a ray which travels in the direction perpendicular to the xy plane from an edge in the x axis direction.

Other Preferable Embodiments

Shapes of the light exiting surfaces of Examples 1 to 3 are represented by Equation (2). The shapes are symmetric about z axis. The shapes can be unsymmetrical about z axis in place of the shapes represented by Equation (2). For example, the light exiting surface can be shaped such that the shape in the yz cross section is slightly convex around the center and the shape remains slightly convex from the center to the edges in the yz cross section without a point of inflection while the shape in the xz cross section is slightly concave around the center and the shape becomes convex around the edges in the xz cross section with a point of inflection therebetween. Further, a shape of the light exiting surface with which total reflection will not occur inside the optical element is also preferable.

For example, the shape of the light exiting surface which is represented by the following equation can be employed.

$$z = \frac{cr^2}{1+\sqrt{1-(1+k)c^2 r^2}} + \sum_{i=0} \sum_{j=0} A_{ij} \cdot x^i y^j \quad (10)$$

$$c = 1/R$$

$$r^2 = x^2 + y^2$$

z represents a distance in the z axis direction from the vertex of the light receiving surface to a point on the light receiving surface. c represents a curvature, R represents a curvature radius, k represents conic constant, and $A_{ij}$ represents a coefficient of a term including xy. i and j represent integers of suffixes of the coefficient.

Tables 18 and 19 show values of coefficients of Equation (10), which represents the light exiting surface. The coefficients which are not shown in the table are zero.

TABLE 18

| Coefficient | Light exiting surface |
|---|---|
| C | 0.000 |
| K | 0.000 |

TABLE 19

| I | j | Light exiting surface |
|---|---|---|
| 2 | 0 | −1.200E−01 |
| 0 | 2 | 8.336E−03 |

TABLE 19-continued

| I | j | Light exiting surface |
|---|---|---|
| 4 | 0 | 2.880E−04 |
| 0 | 4 | 5.889E−04 |
| 6 | 0 | −2.292E−07 |
| 0 | 6 | −2.103E−06 |
| 8 | 0 | 7.101E−09 |
| 0 | 8 | 1.096E−08 |
| 10 | 0 | 2.660E−11 |
| 0 | 10 | −6.708E−10 |
| 12 | 0 | 4.329E−13 |
| 0 | 12 | 1.137E−11 |

The shape of the light exiting surface described above enables more flexible control of rays in the x and y directions, in comparison with shapes which are represented by Equation (2) and are symmetric about z axis.

What is claimed is:

1. An optical element comprising a light receiving surface which is configured to cover a light source arranged on a plane and a light exiting surface which covers the light receiving surface, the optical element being configured such that light rays from the light source passes through the light receiving surface and the light exiting surface and goes to the outside for illumination, wherein when an axis which passes through the center of the light source and which is perpendicular to the plane is designated as a z axis, an x axis and a y axis are determined such that the x axis, the y axis and the z axis are orthogonal to one another and the bottom of the optical element coincides with the xy plane, the point of intersection of the x axis, the y axis, and the z axis is designated as the origin, the maximum value of the x coordinate of the light source from the origin is designated as b and the maximum value of the y coordinate of the light source from the origin is designated as a, the top of the light receiving surface is a point of intersection with the z axis, and wherein when in a cross section containing the x axis and the z axis, an angle which a straight line that passes through the origin and forms an angle of θrx with the z axis forms, at a point of intersection with the light receiving surface, with the normal to the light receiving surface is designated as φx, in a cross section containing the y axis and the z axis, an angle which a straight line that passes through the origin and forms an angle of θry with the z axis foil is, at a point of intersection with the light receiving surface, with the normal to the light receiving surface is designated as φy, φx and φy are assumed to be a function of θrx and a function of θry, respectively, and θrx=θry=θr, the light receiving surface is configured such that $$\varphi_y > \varphi_x$$

is satisfied for the same value of θrx=θry=θr in the range 0<θr<60°, wherein when in a cross section containing the x axis and the z axis, an angle which a path of one of the light rays which travels from a point b which is located at a distance of b from the origin and on the x axis, in the direction of the z axis forms, after having passed through the light receiving surface, with the z axis direction is designated as θib, the curvature of the light receiving surface in the cross section containing the x axis and the z axis is different from the curvature of the light receiving surface in the cross section containing the y axis and the z axis, in a cross section containing the y axis and the z axis, an angle which a path of one of the light rays which travels from a point a which is located at a distance of a from the origin and on the y axis, in the direction of the z axis forms, after having passed through the light receiving surface, with the z axis direction is designated as θia, an angle which forms, after having passed through the light exiting surface, with the z axis direction is designated as θea, a distance from the point a to a point of intersection between the normal at the point a to the xy plane and the light receiving surface is designated as ha, and an angle which a path of one of the light rays which travels from the origin at an angle of arctan(a/ha) with respect to the z axis foil is, after having passed through the light exiting surface, with the z axis direction is designated as $\theta_{eha}$, the light receiving surface is configured such that $\theta_{ia} > \theta_{ib}$ is satisfied, and the light receiving surface and the light exiting surface are configured such that $\theta_{eha} > 45°$ $\theta_{ea} > 45°$ are satisfied.

2. The optical element according to claim 1, wherein the light receiving surface is further configured such that $\tan(\theta_{eha}) > 2$ is satisfied.

3. The optical element according to claim 1, wherein when in a cross section containing the x axis and the z axis, an angle which a path of one of the light rays which travels from the origin at an angle of θrx with respect to the z axis forms, after having passed through the light exiting surface, with the z axis direction is designated as θex, and in a cross section containing the y axis and the z axis, an angle which a path of one of the light rays which travels from the origin at an angle of θry with respect to the z axis forms, after having passed through the light exiting surface, with the z axis direction is designated as θey, θex and θey are assumed to be a function of θrx and a function of θry, respectively, and θrx=θry=θr, the light receiving surface and the light exiting surface are configured such that $\theta_{ex} > \theta_r$ $\theta_{ey} > \theta_r$ are satisfied in the range 0<θr<60°.

4. An illumination device comprising the light source arranged and the optical element according to claim 1, the optical element covering the light source.

5. The illumination device according to claim 4, wherein a shape of the light source in the xy plane has x-axis symmetry and y-axis symmetry.

6. An illumination module wherein illumination devices, each of which is the illumination device according to claim 4, are arranged in a single line or in plural lines in the x axis direction.

7. The illumination module according to claim 6, wherein the illumination module has a rectangular surface having sides in the x axis direction and in the y axis direction and when a distance in the y axis direction from a side in the x axis direction to the center of one of the light sources in the line of illumination devices, the line being the closest to the side in the x axis direction is designated as Ymax and a distance in the z axis direction from the surface on which the illumination devices are arranged to a plane to be illuminated is designated as D, $$\frac{Y_{max}}{D} > \tan(\theta_{eha})$$

is satisfied.

8. The illumination module according to claim 6, wherein when an interval in the x axis direction between illumination devices is designated as Xp, a distance in the z axis direction from a surface on which the illumination devices are arranged to a plane to be illuminated is designated as D, and in a cross section containing the x axis and the z axis, an angle which a path of one of the light rays which travels from a point b which is located at a distance of b from the origin and on the x axis, in the direction of the z axis forms, after having passed through the light exiting surface, with the z axis direction is designated as θeb, $$\frac{X_p}{D} > \tan(\theta_{eb})$$

is satisfied.

* * * * *